United States Patent
Omran et al.

(10) Patent No.: US 10,196,066 B2
(45) Date of Patent: Feb. 5, 2019

(54) AUTOMOTIVE PRODUCTIVITY MANAGER FOR POWER SHIFT TRANSMISSIONS

(71) Applicant: CNH Industrial America LLC, New Holland, PA (US)

(72) Inventors: Ashraf Mohammed Kandeel Omran, Clarendon Hills, IL (US); Garth Harvey Bulgrien, Ephrata, PA (US); Brian Allen Hartman, Valparaiso, IN (US)

(73) Assignee: CNH Industrial America LLC, New Holland, PA (US)

( * ) Notice: Subject to any disclaimer, the term of this patent is extended or adjusted under 35 U.S.C. 154(b) by 292 days.

(21) Appl. No.: 15/166,332

(22) Filed: May 27, 2016

(65) Prior Publication Data
US 2017/0197624 A1    Jul. 13, 2017

Related U.S. Application Data

(60) Provisional application No. 62/277,408, filed on Jan. 11, 2016.

(51) Int. Cl.
*B60W 30/188*    (2012.01)
*F16H 61/02*    (2006.01)
(Continued)

(52) U.S. Cl.
CPC ........ *B60W 30/1882* (2013.01); *A01B 71/06* (2013.01); *A01B 76/00* (2013.01); *B60K 17/02* (2013.01); *B60K 17/28* (2013.01); *B60K 25/02* (2013.01); *B60W 10/06* (2013.01); *B60W 10/11* (2013.01); *F02D 29/02* (2013.01);
(Continued)

(58) Field of Classification Search
None
See application file for complete search history.

(56) References Cited

U.S. PATENT DOCUMENTS 4,731,727 A    3/1988    Rauch et al.
4,855,913 A    8/1989    Brekkestran et al.
(Continued)

OTHER PUBLICATIONS

Xi, Lu et al., "Simulation of Gear Shift Algorithm for Automatic Transmission Based on MATLAB," World Congress on Software Engineering, May 19, 2009, vol. 2, pp. 476-480, http://ieeexplore.ieee.org/xpl/login.jsp? p=&arnumber=5319568&url=http%3A%2F%2Fieeexplore.ieee.org%2Fxpls%2Fabs_all.jsp%3Farnumber%3D5319568.

*Primary Examiner* — Ramya P Burgess
*Assistant Examiner* — Timothy Hannon
(74) *Attorney, Agent, or Firm* — Rickard K. DeMille; Rebecca L. Henkel

(57) ABSTRACT

A system includes an engine, a transmission driven by the engine, and a controller. The controller is configured to receive a speed input, receive feedback indicative of a load of the engine at a current engine speed, compare the load to a predetermined load threshold at the current engine speed, determine an expected engine speed based at least on the current engine speed, a current gear ratio, and an expected gear ratio, determine an estimated engine power at the expected engine speed and a current engine power at the current engine speed, and command a gear downshift when the load is greater than or equal to the predetermined load threshold and when the estimated engine power is greater than the current engine power.

9 Claims, 5 Drawing Sheets

(51) Int. Cl.
  F16H 59/14    (2006.01)
  B60W 10/06    (2006.01)
  B60W 10/11    (2012.01)
  A01B 76/00    (2006.01)
  F02D 29/02    (2006.01)
  F02D 31/00    (2006.01)
  F02D 41/10    (2006.01)
  F02D 41/26    (2006.01)
  B60K 17/02    (2006.01)
  B60K 17/28    (2006.01)
  F16D 48/02    (2006.01)
  F16D 48/06    (2006.01)
  A01B 71/06    (2006.01)
  B60K 25/02    (2006.01)
  F02D 41/14    (2006.01)
  F02D 41/02    (2006.01)

(52) U.S. Cl.
  CPC ........... *F02D 31/002* (2013.01); *F02D 41/10* (2013.01); *F02D 41/26* (2013.01); *F16D 25/14* (2013.01); *F16D 48/06* (2013.01); *F16D 48/066* (2013.01); *F16H 61/0204* (2013.01); *F16H 61/0213* (2013.01); *B60W 2510/0638* (2013.01); *B60W 2510/0666* (2013.01); *B60W 2510/1005* (2013.01); *B60W 2710/0677* (2013.01); *B60W 2710/1005* (2013.01); *B60Y 2200/221* (2013.01); *F02D 41/023* (2013.01); *F02D 2041/1409* (2013.01); *F02D 2200/101* (2013.01); *F02D 2200/1004* (2013.01); *F16D 2500/1027* (2013.01); *F16D 2500/10437* (2013.01); *F16D 2500/111* (2013.01); *F16D 2500/30421* (2013.01); *F16D 2500/30426* (2013.01); *F16D 2500/30428* (2013.01); *F16D 2500/3165* (2013.01); *F16D 2500/5048* (2013.01); *F16D 2500/50287* (2013.01); *F16D 2500/50296* (2013.01); *F16D 2500/70418* (2013.01); *F16D 2500/70663* (2013.01); *F16D 2500/70673* (2013.01); *F16H 2059/147* (2013.01); *F16H 2061/0216* (2013.01); *F16H 2306/46* (2013.01); *F16H 2306/50* (2013.01)

(56) References Cited

U.S. PATENT DOCUMENTS

| | | | |
|---|---|---|---|
| 5,079,705 A * | 1/1992 | Sakai | F16H 61/0213 477/120 |
| 5,393,277 A | 2/1995 | White et al. | |
| 6,003,396 A | 12/1999 | Bellinger et al. | |
| 6,364,809 B1 | 4/2002 | Cherry | |
| 8,121,763 B2 | 2/2012 | Hou | |
| 9,097,344 B2 | 8/2015 | Hoff et al. | |
| 2010/0121543 A1* | 5/2010 | Landes | F16H 61/0213 701/54 |
| 2012/0226422 A1* | 9/2012 | Jacobson | F16H 61/0213 701/58 |
| 2013/0245896 A1* | 9/2013 | Velde | G06F 17/00 701/50 |
| 2014/0172256 A1* | 6/2014 | Landes | F16H 61/0213 701/65 |
| 2015/0175165 A1* | 6/2015 | Bulgrien | B60W 10/06 477/110 |
| 2017/0174220 A1* | 6/2017 | Puri | B60W 30/19 |

* cited by examiner

AUTOMOTIVE PRODUCTIVITY MANAGER FOR POWER SHIFT TRANSMISSIONS

CROSS REFERENCE TO RELATED APPLICATIONS

This application claims priority from and the benefit of U.S. Provisional Patent Application No. 62/277,408, entitled "TRANSMISSION AND POWER TAKE-OFF SYSTEMS FOR AN OFF-ROAD VEHICLE," filed Jan. 11, 2016, which is hereby incorporated by reference in its entirety.

BACKGROUND

The present application relates generally to transmissions, and more particularly, to an automotive productivity manager for power shift transmissions.

Various types of work vehicles (e.g., tractors, floaters, sprayers, or the like) may be used to plow a field, till land, plant seeds, or accomplish other similar agricultural operations. Typical work vehicles include an engine configured to power the vehicle, and a transmission configured to transfer engine power to rotating wheels at a desired gear ratio. Some work vehicles include controllers that adjust an amount of power supplied by the engine to ultimately achieve a desired speed. Unfortunately, in some cases, the amount of engine power available may not be sufficient to achieve the desired speed.

BRIEF DESCRIPTION

In one embodiment, a system includes an engine, a transmission with multiple gear ratios driven by the engine, and a controller. The controller is configured to receive a speed input, receive feedback indicative of a load of the engine at a current engine speed, compare the load to a predetermined load threshold at the current engine speed, determine an expected engine speed based at least on the current engine speed, a current gear ratio at the current engine speed, and an expected gear ratio at the expected engine speed, determine an estimated engine power at the expected engine speed and a current engine power at the current engine speed, and command a gear downshift when the load is greater than or equal to the predetermined load threshold and when the estimated engine power is greater than the current engine power, such that a current speed is closer to the speed input.

In another embodiment, a system includes an engine, a transmission with multiple gear ratios driven by the engine, and a controller. The controller is configured to receive a speed input, determine an expected engine speed based at least on a current engine speed, a current gear ratio at the current engine speed, and an expected gear ratio at the expected engine speed, determine an estimated engine power at the expected engine speed and a current engine power at the current engine speed, adjust the current engine power to an adjusted engine power, and command a gear upshift when the estimated engine power is greater than or equal to the adjusted engine power, such that a current speed is closer to the speed input.

In another embodiment, a method includes receiving a speed input, receiving feedback indicative of a load of the engine at a current engine speed, comparing the load to a predetermined load threshold at the current engine speed, determining an expected engine speed based at least on the current engine speed, a current gear ratio at the current engine speed, and an expected gear ratio at the expected engine speed, determining an estimated engine power at the expected engine speed and a current engine power at the current engine speed, adjusting the current engine power to an adjusted engine power, commanding a gear downshift when the load is greater than or equal to the predetermined load threshold and when the estimated engine power is greater than the current engine power, and commanding a gear upshift when the estimated engine power is greater than or equal to the adjusted engine power.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

The embodiments disclosed herein relate to a system that includes a controller configured to achieve a desired speed input (e.g., set by an operator). The controller may include an automotive productivity manager (APM) with algorithms that enable the controller to reach the desired speed (e.g., wheel speed). The APM algorithms may adjust engine speed and/or a gear index of a transmission to reduce fuel consumption while maintaining the desired speed. However, in some conditions the engine may not be able to provide enough power to maintain the desired speed. Accordingly, as discussed herein, the controller may adjust a gear index of a transmission of the work vehicle in order to approach the desired speed.

Additionally, in varying load conditions, traditional work vehicle controllers may increase engine speed and/or adjust a gear index of the transmission relatively frequently, thereby increasing fuel consumption of the work vehicle (e.g., since shifting converts some input power to waste heat) and/or reducing operator comfort. Accordingly, embodiments of the present disclosure include applying a sensitivity factor to block frequent adjustment of an operating parameter of the work vehicle (e.g., a gear index of the transmission). Blocking the adjustment of one or more operating parameters may enable fuel efficiency to be enhanced because such adjustment may not be performed until the benefits provided to the work vehicle (e.g., increased engine power) outweigh the amount of additional fuel consumed to complete the shift.

Figure 1:
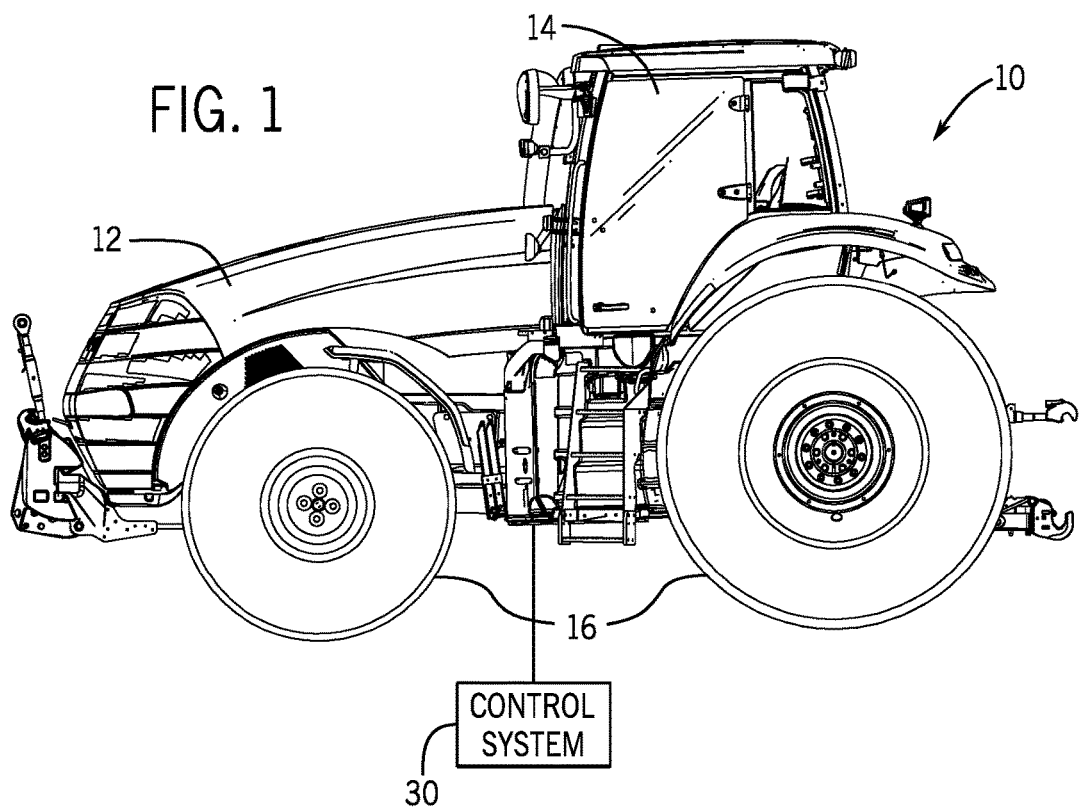
FIG. 1 is a schematic side view of an embodiment of a work vehicle, in accordance with an aspect of the present disclosure.

With the foregoing in mind, FIG. 1 is a perspective view of an embodiment of an off-road vehicle 10 having a controller. In the illustrated embodiment, the vehicle 10 is an agricultural tractor. However, any suitable off-road vehicle, including combines, trucks, and so forth, may utilize aspects of the disclosed embodiments. In the illustrated embodiment, the vehicle 10 includes a body 12 and a cabin 14 in which an operator may sit to operate the vehicle 10. The body 12 may house an internal combustion engine, a transmission, and a power train for driving one or more wheels 16. It should be understood that in some vehicles such wheels 16 may be replaced with tracks or other drive systems. As discussed in more detail below, the work vehicle 10 may include a control system 30. The control system 30 may be configured to shift gears and to adjust the speed (e.g., wheel speed) to a speed input (e.g., as specified by an operator) based at least on available engine power, engine speed, and/or a gear index of a transmission.

Figure 2:
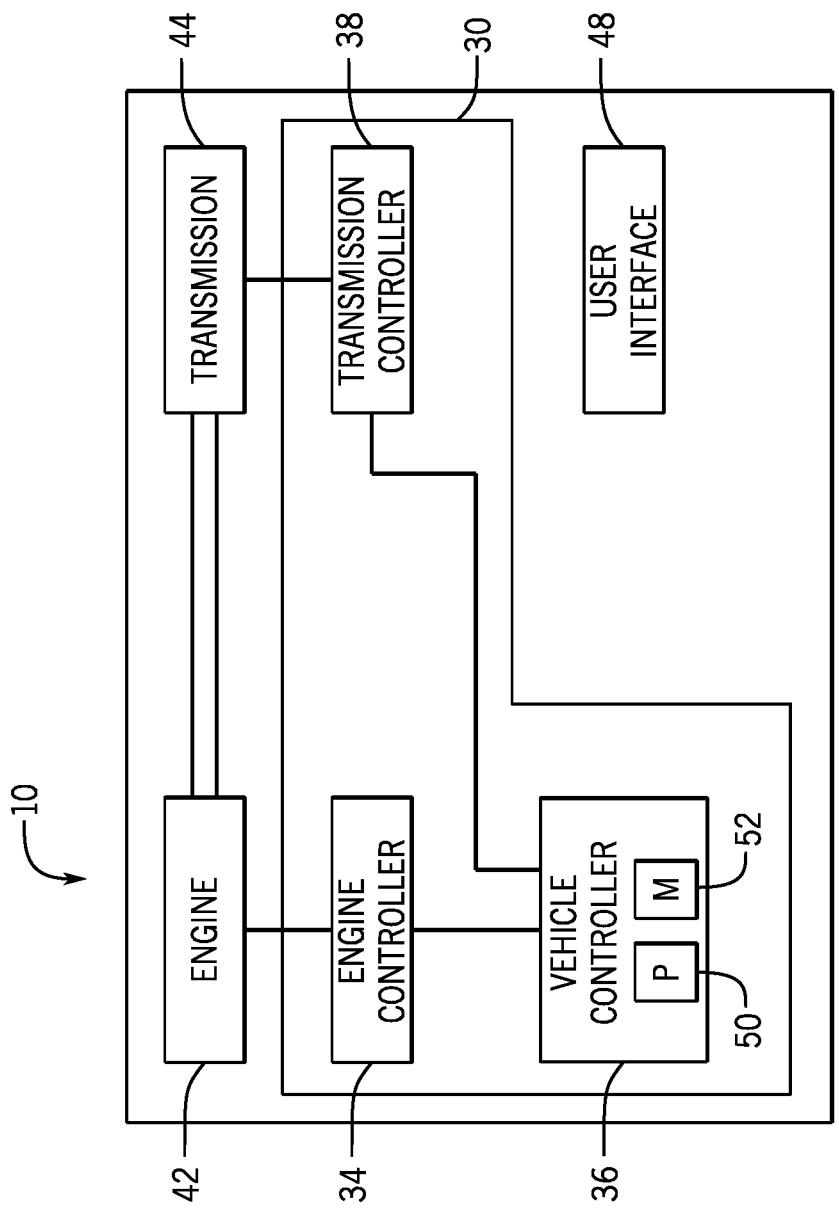
FIG. 2 is a block diagram of an embodiment of a control system that may be utilized to control the work vehicle of FIG. 1, in accordance with an aspect of the present disclosure.

FIG. 2 depicts a block diagram of an embodiment of the control system 30 that may be utilized to control the vehicle 10 of FIG. 1. The control system 30 includes an engine controller 34, a vehicle controller 36, and a transmission controller 38. As will be appreciated, the controllers 34, 36, and 38 may each include one or more processors, memory devices, and/or storage devices. Furthermore, the engine controller 34 and the transmission controller 38 are communicatively coupled to the vehicle controller 36. In this configuration, the controllers 34, 36, and 38 function cooperatively to control operation of an engine 42 and a transmission 44. The engine controller 34 is configured to control the engine 42, and the transmission controller 38 is configured to control the transmission 44. The engine 42 may be any suitable device configured to transfer torque to the transmission system 44. The transmission controller 38 may instruct the transmission 44 to shift gears (e.g., upshift or downshift). As will be discussed in more detail herein, shifting gears of the transmission 44 may enable an actual (e.g., measured) speed of the vehicle 10 (e.g., the wheels 16) to reach a desired speed input (e.g., as specified by an operator). In certain embodiments, the transmission 44 is a step ratio transmission that includes multiple discrete gears (e.g., as compared to a continuously variable transmission). Each gear of the transmission has an associated gear index and establishes a different gear ratio when selected. Increasing the gear index (e.g., upshifting) reduces the gear ratio, and decreasing the gear index (e.g., downshifting) increases the gear ratio. As shown, the control system 30 may also include a user interface 48.

In the illustrated embodiment, the engine controller 34 may receive signals from sensors configured to output data indicative of a condition (e.g., speed and/or load) of the engine 52. In certain embodiments, the engine controller 34 may adjust the engine 42 such that the engine speed reaches a desired speed (e.g., by controlling an air/fuel flow into the engine). The vehicle controller 36 is communicatively coupled to the engine controller 34 and to the transmission controller 38. In the illustrated embodiment, the vehicle controller 36 includes a memory 50 and a processor 52. The memory 50 may be any type of non-transitory machine readable medium for storing data and executable instructions, such as random-access memory, read-only memory, rewritable flash memory, hard drives, optical discs, and the like. The processor 52 may execute instructions stored on the memory 50. For example, the memory 50 may contain machine readable code, such as instructions, that may be executed by the processor 52. In some embodiments, the memory 50 and the processor 52 of the vehicle controller 36 may instruct the engine controller 34 to adjust an engine speed and/or the transmission controller 38 to automatically shift (e.g., processor/memory controlled) between gears of the transmission 44 to reach the desired speed input (e.g., wheel speed), for example.

The speed input may be set by an operator (e.g., via a speed control lever, the user interface 48, or other input device). An automotive productivity manager (APM) function (e.g., stored in memory of the control system 30) may be configured to determine a corresponding transmission output (e.g., transmission output speed) and a corresponding desired engine speed based on the speed input, the transmission output, a load of the engine (e.g., a percentage load indicative of available engine power), an engine power, and/or an amount of fuel consumption. For example, the corresponding transmission output (e.g., transmission output speed) may be determined based on the speed input, an axle ratio, and/or tire radius. The corresponding desired engine speed may be determined based on the corresponding transmission output, available engine power, gear index, and/or current gear ratio. Further, a combination of the corresponding transmission output and corresponding desired engine speed may be selected to reduce fuel consumption (e.g., minimize an amount of fuel consumed by the vehicle 10).

The control system 30 may be configured to receive signals indicative of a speed of the vehicle 10 (e.g., the wheels 16) and/or an engine speed to determine a measured speed of the vehicle 10 (e.g., wheel speed) and a measured engine speed. Accordingly, the control system 30 may be configured to compare the measured speed of the vehicle 10 and/or the measured engine speed to the speed input and/or the desired engine speed, respectively. When one or both of the measured speed of the vehicle 10 and the measured engine speed are not substantially equal to (e.g., within 5% to 10% of) the speed input and the desired engine speed, respectively, the control system 30 may send a signal to the engine 42 and/or the transmission 44 to adjust an operating condition (e.g., a gear index of the transmission 44). Such an adjustment may ultimately enable the measured speed of the vehicle 10 to approach the speed input.

The control system 30 may be configured to determine a load (e.g., percentage load) of the engine 42 at the current engine speed based on feedback received from the engine controller 34 (e.g., sensors included in the engine 42 may send signals to the engine controller 34). In some embodiments, the control system 30 may determine the load of the engine 42 based on a torque ratio. The torque ratio may be engine torque at the current engine speed divided by a desired available engine torque at the current engine speed. Additionally, the engine controller 34 and/or the vehicle controller 36 may store a look-up table or chart (e.g., FIG. 3) that may include a load threshold (e.g., percentage load threshold) at a variety of engine speeds. Accordingly, the control system 30 may compare the load to the load threshold at the current engine speed. When the load is greater than or equal to the load threshold, the control system 30 may adjust one or more operating parameters of the engine 42 and/or the transmission 44 (e.g., decrease a gear index of the transmission 44).

In certain embodiments, the control system 30 may adjust a gear index (e.g., $i_{req}$) and an engine speed ($ERPM_{req}$) to achieve a desired speed (e.g., input speed) of the vehicle 10 ($ORPM_{req}$). In some cases, the control system 30 may not be able to increase the engine power when the load is at or above the load threshold. Accordingly, the APM function of the control system 30 may be configured to adjust the gear index (e.g., decrease the gear index or downshift) to approach the desired speed (e.g., speed input). In some embodiments, the control system 30 may be configured to adjust the gear index (e.g., downshift) when an estimated engine power corresponding to an expected engine speed (e.g., the speed of the engine 42 after the gear index is adjusted) is greater than a current engine power corresponding to the current engine speed. However, the control system 30 may not adjust the gear index when the estimated engine power is less than or equal to the current engine power.

Accordingly, the APM function may include algorithms configured to calculate the estimated engine power that corresponds to the expected engine speed. For example, the control system 30 may determine the expected engine speed utilizing the current engine speed, a current gear ratio at the current engine speed, and an expected gear ratio at the expected engine speed. During an upshift, the gear ratio decreases. Additionally, during a downshift, the gear ratio increases.

In some embodiments, the APM function enables the control system 30 to determine the expected engine speed, $\omega_{eng}^{Exp}$, based on Equation 1.

$$\omega_{eng}^{Exp} = \alpha_{Adj} \omega_{eng}^{Cur} \quad (1)$$

Accordingly, the expected engine speed may be determined by multiplying the current engine speed, $\omega_{eng}^{Exp}$ by an adjustment factor, $\alpha_{Adj}$. For example, in some embodiments, the adjustment factor may correspond to a ratio between an expected gear ratio, $n_{Exp}$, (e.g., a gear ratio after adjusting the gear index) and a current gear ratio, $n_{Cur}$, as shown in Equation 2.

$$\alpha_{Adj} = \frac{n_{Exp}}{n_{Cur}} \quad (2)$$

When downshifting, the adjustment factor may be greater than 1 because the gear ratio increases as a result of downshifting. Similarly, when upshifting, the adjustment factor may be less than 1 because the gear ratio decreases as a result of upshifting.

When the control system 30 has determined the expected engine speed, the control system 30 may calculate the estimated engine power at the expected engine speed using a look-up table or chart (e.g., FIG. 4), for example. In some embodiments, the look-up table or chart may include experimental data related to engine power at various engine speeds. Accordingly, the control system 30 may determine the estimated engine power at the expected engine speed and compare the estimated engine power to the current engine power at the current engine speed. When the estimated engine power after a downshift is greater than the current engine power, the control system 30 may send a signal to the transmission 44 to downshift (e.g., decrease a gear index of the transmission 44) such that the engine power increases, thereby supplying more power to the wheels 16 such that the measured (e.g., actual) speed of the vehicle 10 approaches the speed input (e.g., desired speed of the vehicle 10).

Additionally, even when the load of the engine 42 does not exceed the load threshold, the control system 30 may adjust operating conditions of the engine 42 and/or the transmission 44. For example, the control system 30 may be configured to determine whether upshifting (e.g., increasing a gear index of the transmission 44) may enable the measured speed of the vehicle 10 to approach the speed input.

Accordingly, the control system 30 may determine a current power of the engine 42, $P(\omega_{eng})$ based on a current speed of the engine 42, $\omega_{eng}$, and a current engine torque, $T_{eng}$. In some embodiments, the control system 30 may use Equation 3 to determine the current engine power.

$$P(\omega_{eng}) = T_{eng} \times \omega_{eng} \quad (3)$$

In other embodiments, the control system 30 may utilize a lookup table or chart (e.g., FIG. 4) to determine the current engine power based on the current engine speed.

Additionally, an expected engine speed, $\omega_{eng}^{Exp}$ may be determined utilizing Equation 1, which may calculate the expected engine speed based on an adjustment factor, $\alpha_{Adj}$, and the current engine speed, $\omega_{eng}^{Exp}$. As discussed above, the adjustment factor may be calculated using the current gear ratio, $n_{Cur}$, and the expected gear ratio, $n_{Exp}$, as shown in Equation 2.

Figure 4:
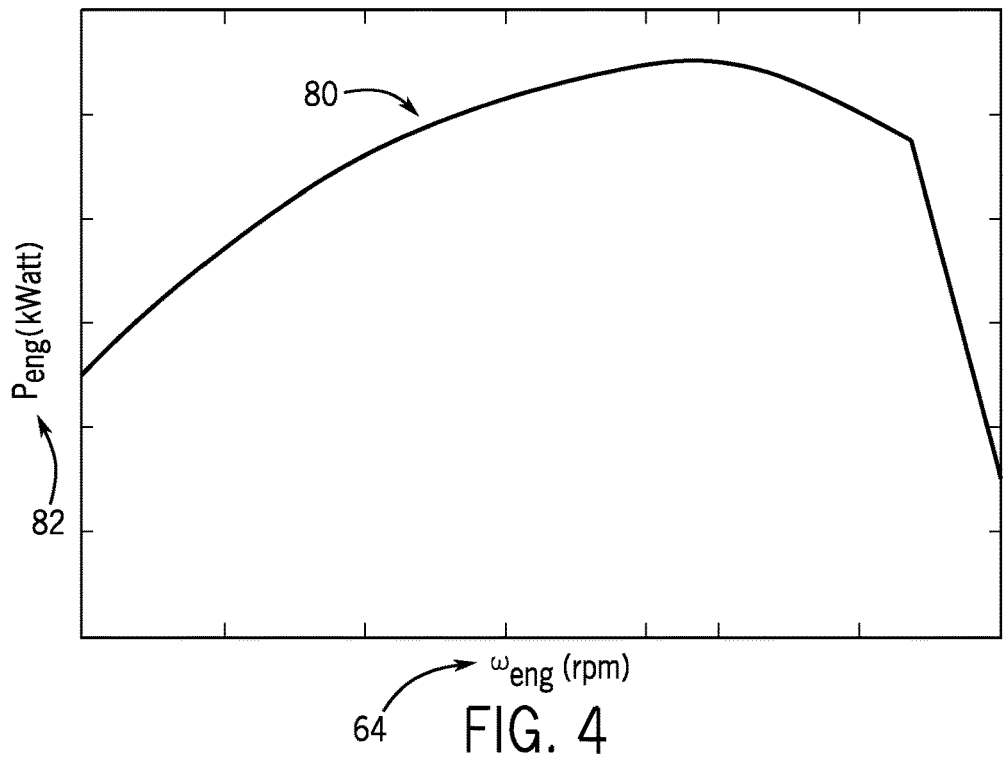
FIG. 4 is an embodiment of a power-RPM curve showing an engine power versus an engine RPM, in accordance with an aspect of the present disclosure.

When the expected engine speed has been calculated, the estimated power of the engine 42 at the expected engine speed, $P(\omega_{eng}^{Exp})$, may be determined by a lookup table or a chart (e.g., FIG. 4). However, the control system 30 may not adjust a gear index of the transmission 44 or a speed of the engine 42 unless the estimated engine power is greater than the current engine power, $P(\omega_{eng}^{Exp})$, by a threshold amount (e.g., such that the amount of power supplied to the wheels 16 may enabled the measured speed of the vehicle 10 to increase and approach the desired speed of the vehicle 10). Blocking adjustment of the gear index unless the estimated engine power is greater than the current engine power by a threshold amount may enhance fuel efficiency of the vehicle 10 by blocking frequent shifts (e.g., each shift results in additional consumption of fuel). Accordingly, it is now recognized that it may be desirable to block adjustment of the gear index of the transmission 44 until the estimated engine power is greater than the current engine power by a threshold amount to ensure that the benefit (e.g., additional engine power) justifies the increased fuel consumption (e.g., caused by shifting).

In order to block adjustment of the gear index, a sensitivity factor (SF) may be applied to the current engine power. The sensitivity factor may enable the control system 30 to determine whether the estimated engine power is greater than the current engine power by a threshold amount (e.g., the sensitivity factor multiplier). Equation 4 may be utilized to determine when to perform a shift by comparing the estimated engine power to the current engine power using the sensitivity factor.

$$P(\omega_{eng}^{Exp}) \geq SF \times P(\omega_{eng}^{Exp}) \quad (4)$$

In certain embodiments, the sensitivity factor may be set by an operator based on a desired response speed for adjusting the gear index. As discussed above, it may not be desirable to adjust a gear index of the transmission 44 at the moment the estimated engine power exceeds the current engine power because the additional power may not justify the increased fuel consumption and power absorbed by the shift. Accordingly, the operator may set a desired sensitivity such that the adjustment of the gear index does not occur until the estimated engine power is greater than the current engine power by a threshold amount (e.g., when $(SF \times P(\omega_{eng}^{Cur}) - P(\omega_{eng}^{Cur})$ is equal to a threshold amount predetermined by the operator).

In some embodiments, the user interface 48 may enable the operator to input a sensitivity value ranging between 0 and 100, for example. The sensitivity value may then be utilized to calculate the sensitivity factor. For example, a sensitivity value of 0 may correspond to a sensitivity factor of 1.5, and a sensitivity value of 100 may correspond to a sensitivity factor of 1.05. It should be noted that the range of sensitivity values and sensitivity factors may be any suitable ranges of numbers. In any case, utilizing a higher sensitivity value may cause the gear index of the transmission 44 to increase earlier than utilizing a lower sensitivity value (e.g., shift when the estimated engine power is 1.05 times greater than the current engine power as opposed to shifting when the estimated engine power is 1.5 times greater than the current engine power). In other words, the higher the sensitivity, the earlier the control system 30 may instruct the transmission 44 to adjust the gear index (e.g., upshift or downshift). In other embodiments, the operator may input the sensitivity factor directly into the user interface 48 as compared to inputting a sensitivity value. The sensitivity factor may range from values between 1.001 and 2.00, 1.01 and 1.75, or 1.01 and 1.60, for example.

Figure 3:
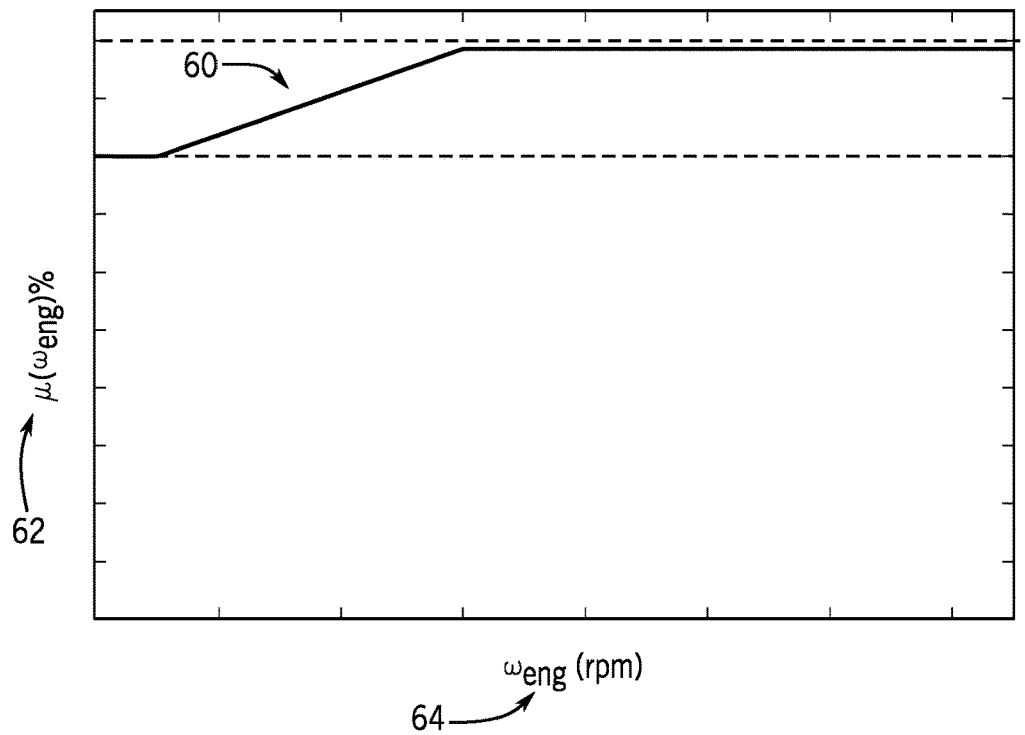
FIG. 3 is an embodiment of a load-RPM curve showing a predetermined load threshold of an engine versus an engine RPM, in accordance with an aspect of the present disclosure.

FIG. 3 is an embodiment of a graph 60 showing a load threshold (e.g., percentage load threshold) of an engine 62 versus an engine speed 64. As discussed above, the curve 60 may be utilized to determine a load threshold at a current engine speed and/or at an expected engine speed. Operating the engine above the load threshold may cause the engine to stall. When the load exceeds the load threshold, it may be desirable to adjust the gear index of the transmission 44.

FIG. 4 depicts a power-engine speed curve 80 showing the engine power 82 versus the engine speed 64. Based on an engine power that may achieve the desired speed of the vehicle 10 (e.g., speed input), the control system 30 may select an engine speed 64 based on the curve 80. Additionally, the curve 80 may enable the control system 30 to compare the estimated engine power to the current engine power to determine whether to adjust the gear index of the transmission 44 (e.g., when the expected engine power exceeds the current engine power by a threshold amount).

Figure 5:
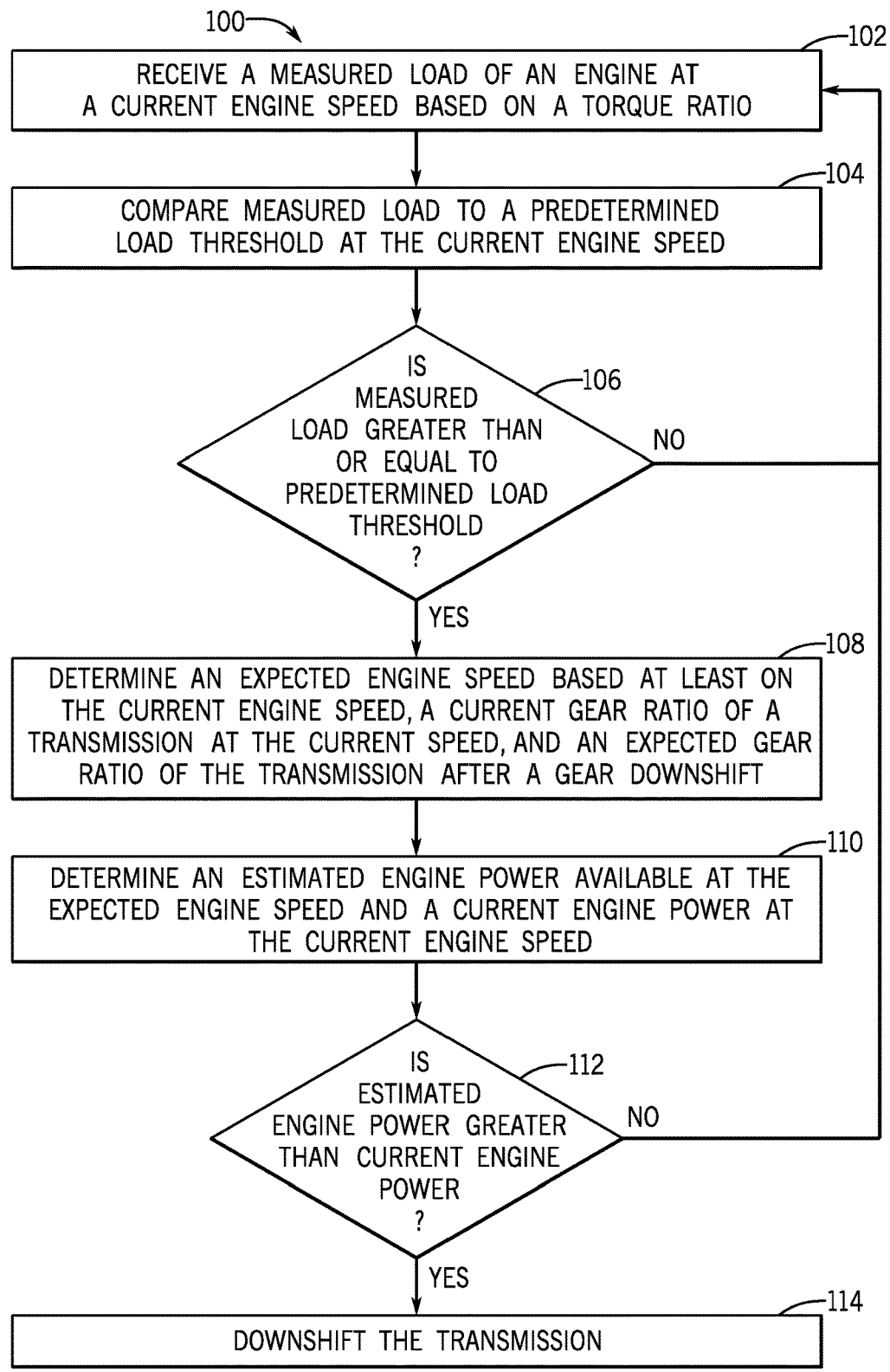
FIG. 5 is a block diagram of an embodiment of a method of downshifting a transmission using the control system of FIG. 2, in accordance with an aspect of the present disclosure.

FIG. 5 is a block diagram of an embodiment of a method 100 for adjusting a gear ratio of the transmission 44 of the vehicle 10 using the control system 30. For example, at block 102, the control system 30 may receive or determine a load at the current engine speed. One or more sensors may send feedback to the engine controller 34. The feedback may include a current engine torque value, a current engine torque ratio (e.g., current engine torque divided by a desired engine torque at the current engine speed), and/or an engine speed, which may enable the control system 30 to determine an amount of available engine power (e.g., a load and/or a percentage load). At block 104, the control system 30 may compare the load to a load threshold (e.g., using the curve 60). For example, the control system 30 may determine the load threshold at the current engine speed (e.g., via feedback indicative of the current engine speed) and compare the load to the load threshold.

At block 106, the control system 30 may compare the load to the load threshold. When the load is greater than or equal to the load threshold (block 108), the control system 30 may determine an expected engine speed (e.g., a speed of the engine 42 after an adjustment to the gear index of the transmission 44). To determine the expected engine speed, the control system 30 may utilize the current engine speed, the current gear ratio of the transmission 44, and the expected gear ratio of the transmission 44, as shown in Equations 1 and 2. Conversely, when the load is less than the load threshold, the control system 30 may continue to receive feedback indicative of the load (e.g., return to block 102).

The control system 30 may determine a current engine power at the current engine speed and an estimated engine power at the expected engine speed, at block 110. In some embodiments, the control system 30 may determine the current engine power and/or the estimated engine power using the curve 80 and/or a look-up table. It should be noted that in other embodiments, the control system 30 may determine the current engine power and/or the estimated engine power using Equation 3 (e.g., multiplying engine torque by engine speed).

The control system 30 may compare the estimated engine power to the current engine power, at block 112. For example, the control system 30 may determine whether the estimated engine power is greater than the current engine power. Additionally, at block 114, the control system 30 (e.g., the transmission controller 38) may send a signal to the transmission 44 to adjust the gear index (e.g., decrease the gear index). Accordingly, the transmission 44 may downshift, which may increase the engine power, which in turn, may enable the measured (e.g., actual) speed of the vehicle to approach the desired speed of the vehicle 10 (e.g., speed input) as a result of the increased engine power supplied to the vehicle wheels. Conversely, when the estimated engine power is less than the current engine power, the control system 30 may return to block 102 and continue monitoring the load of the engine 42.

Figure 6:
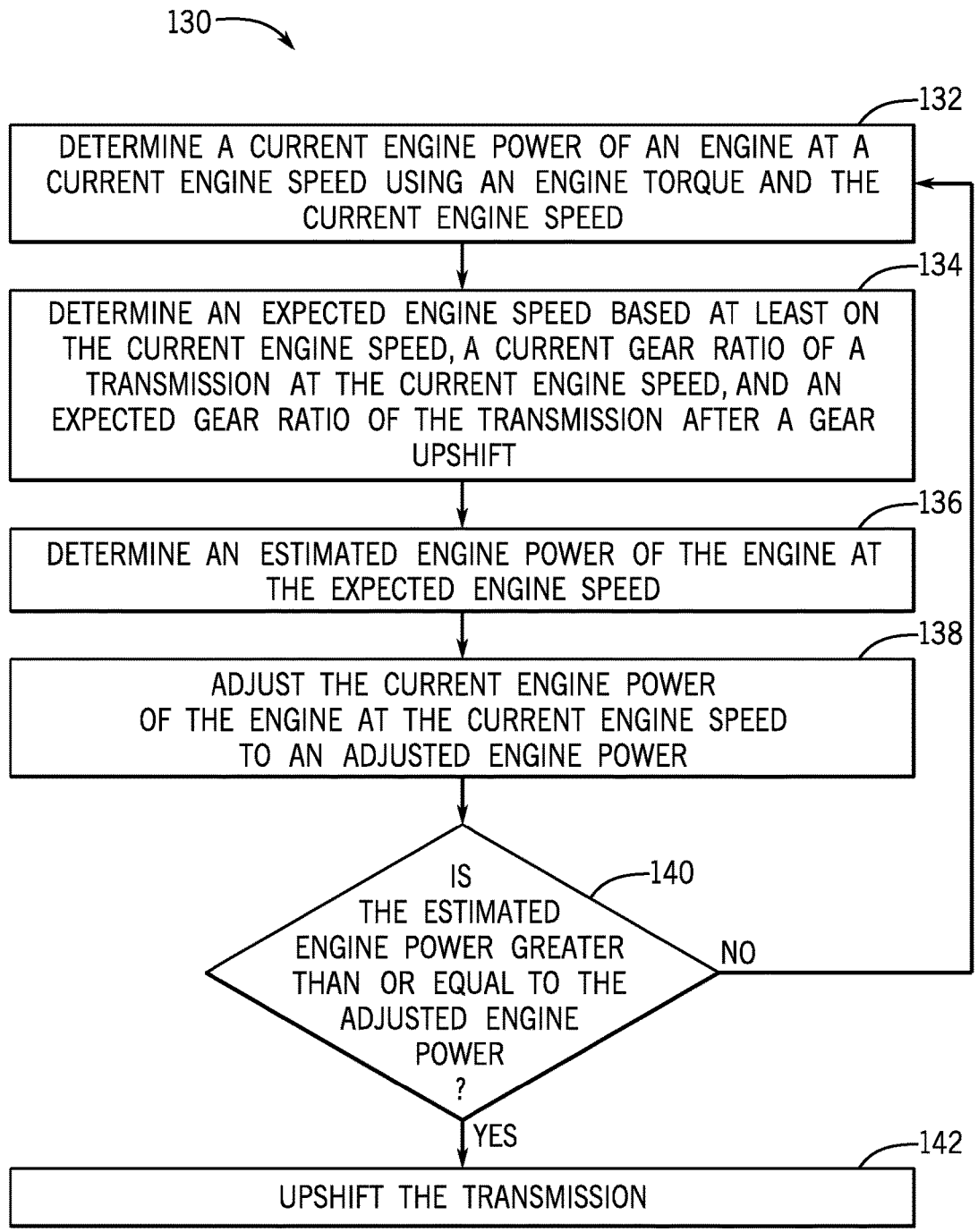
FIG. 6 is a block diagram of an embodiment of a method of upshifting the transmission using the control system of FIG. 2, in accordance with an aspect of the present disclosure.

As discussed above, it may be desirable to adjust operating conditions of the vehicle 10 when the load is less than the load threshold. For example, FIG. 6 is a block diagram of another embodiment of a method 130 for adjusting the gear ratio the transmission 44 of the vehicle 10 using the control system 30. At block 132, the control system 30 may be configured to determine a current engine power of the engine 42 at the current engine speed using engine torque and the current engine speed (e.g., as shown in Equation 3). Additionally, at block 134, the control system 30 may determine an expected engine speed based at least on the current engine speed, a current gear ratio of the transmission 44, and an expected gear ratio of the transmission 44 (e.g., as shown in Equations 4 and 5). When the expected engine speed is calculated, the control system 30 may determine an estimated engine power at the expected engine speed (e.g., using the curve 80), at block 136.

As discussed above, it may not be desirable to adjust the gear index of the transmission 44 immediately when the estimated engine power is greater than the current engine power because doing so may reduce fuel efficiency. For example, shifting gears at the moment when the estimated engine power may cause a momentary increase in fuel and power consumed during the shift. Accordingly, at block 138, the control system 30 may apply a sensitivity factor (e.g., a multiplier between 1.01 and 1.6) to the current engine power, such that adjustment of the gear index is blocked unless the estimated engine power is greater than the current engine power by a threshold amount (e.g., based at least on the sensitivity factor). Applying the sensitivity factor to the current engine power may determine an adjusted engine power.

At block 140, the control system 30 may determine whether the estimated engine power is greater than or equal to the adjusted engine power (e.g., the current engine power multiplied by the sensitivity factor). When the control system 30 determines that the estimated engine power is greater than or equal to the adjusted engine power, the control system 30 (e.g., the transmission controller 38) may adjust a gear index of the transmission 44 (e.g., upshift or increase the gear index), as shown in block 142. However, when the control system 30 determines that the estimated engine power is less than the adjusted engine power, the control system 30 may return to block 132 (e.g., the method 130 starts over).

It should be understood that the steps of method 100 and/or method 130 performed by the control system 30 may be performed by any suitable components of the control system 30, including the controllers 34, 36, 38 using their respective processors and memory components, for example.

While only certain features of the present disclosure have been illustrated and described herein, many modifications and changes will occur to those skilled in the art. It is, therefore, to be understood that the appended claims are intended to cover all such modifications and changes as fall within the true spirit of the present disclosure.

The invention claimed is:

1. A work vehicle, comprising:
an engine;
a transmission with multiple gear ratios driven by the engine; and
a controller configured to:
  receive a speed input;
  receive feedback indicative of a load of the engine at a current engine speed;
  compare the load to a predetermined load threshold at the current engine speed;
  determine an expected engine speed based at least on the current engine speed, a current gear ratio at the current engine speed, and an expected gear ratio after a gear downshift;
  determine an estimated engine power at the expected engine speed and a current engine power at the current engine speed; and
  command the gear downshift when the load is greater than or equal to the predetermined load threshold and when the estimated engine power is greater than the current engine power.

2. The work vehicle of claim 1, comprising a user interface configured to enable an operator to enter the speed input, wherein the user interface sends a signal to the controller that includes the speed input.

3. The work vehicle of claim 1, wherein the feedback indicative of the load is a ratio of a current engine torque divided by a desired engine torque at the current speed.

4. The work vehicle of claim 1, wherein the controller is configured to compare the load to the predetermined load threshold using a load-RPM curve.

5. The work vehicle of claim 1, wherein the controller is configured to determine the expected engine speed by multiplying the current engine speed by an adjustment factor.

6. The work vehicle of claim 5, wherein the adjustment factor comprises a ratio between the current gear ratio and the expected gear ratio.

7. The work vehicle of claim 1, wherein the controller is configured to determine the estimated engine power at the expected engine speed using a power-engine speed curve.

8. The work vehicle of claim 1, wherein the controller is configured to determine the estimated engine power at the expected engine speed using a look-up table relating power to engine speed.

9. The work vehicle of claim 8, wherein the lookup table is stored in a memory of the controller.

\* \* \* \* \*